(12) United States Patent
Guyon et al.

(10) Patent No.: US 11,465,492 B2
(45) Date of Patent: Oct. 11, 2022

(54) VENTILATION DEVICE FOR A VEHICLE, ASSOCIATED MOUNTING METHOD

(71) Applicant: Flex-N-Gate France, Audincourt (FR)

(72) Inventors: Cyrille Guyon, Nommay (FR); David Duquesnoy, Chalonvillars (FR)

(73) Assignee: FLEX-N-GATE FRANCE, Audincourt (FR)

( * ) Notice: Subject to any disclaimer, the term of this patent is extended or adjusted under 35 U.S.C. 154(b) by 286 days.

(21) Appl. No.: 16/838,547

(22) Filed: Apr. 2, 2020

(65) Prior Publication Data
US 2020/0317043 A1 Oct. 8, 2020

(30) Foreign Application Priority Data
Apr. 3, 2019 (FR) ...................................... 1903580

(51) Int. Cl.
| | | |
|---|---|---|
| *B60K 11/08* | (2006.01) | |
| *B62D 37/02* | (2006.01) | |
| *B62D 35/00* | (2006.01) | |

(52) U.S. Cl.
CPC ............ *B60K 11/085* (2013.01); *B62D 37/02* (2013.01); *B62D 35/005* (2013.01)

(58) Field of Classification Search
CPC ....... B60K 11/085; B60K 11/04; B60K 11/08; B62D 37/02; B62D 35/005; Y02T 10/88; F01P 7/10; F01P 11/10; B60R 19/52; B60R 2019/525; B60H 1/3421
See application file for complete search history.

(56) References Cited

U.S. PATENT DOCUMENTS

| | | | | |
|---|---|---|---|---|
| 10,100,707 B2* | 10/2018 | Wolf | .......................... | F01P 7/10 |
| 10,821,826 B2* | 11/2020 | Stenger | ................ | B60K 11/085 |
| 11,260,743 B2* | 3/2022 | Gerber | .................... | B60R 11/04 |
| 2010/0139583 A1* | 6/2010 | Klotz | ................... | B60K 11/085 |
| | | | | 123/41.04 |
| 2011/0048691 A1* | 3/2011 | Shin | ..................... | B60K 11/085 |
| | | | | 165/299 |

(Continued)

FOREIGN PATENT DOCUMENTS

| | | | |
|---|---|---|---|
| CN | 107323399 A | * | 11/2017 |
| DE | 10307632 A1 | | 9/2004 |

(Continued)

OTHER PUBLICATIONS

Translated DE-102018100032-A1) (Year: 2022).*

(Continued)

*Primary Examiner* — James A Shriver, II
*Assistant Examiner* — Ian Bryce Shelton
(74) *Attorney, Agent, or Firm* — Nixon & Vanderhye

(57) ABSTRACT

A ventilation device for a vehicle includes a frame defining an opening and a closure device that includes at least one closure flap extending in the opening. The ventilation device includes a first section having a first external face and at least a second section having a second external face. The external face of the closure flap is formed by the first external face and by the second external face, the first section and the second section extending in continuity of one another. The first section is joined to the second section in a junction region, with a trimming piece that covers at least the junction region on the external face of the closure flap.

11 Claims, 3 Drawing Sheets

(56) References Cited

U.S. PATENT DOCUMENTS

| | | | | |
|---|---|---|---|---|
| 2011/0247779 A1* | 10/2011 | Charnesky | ........... | B60K 11/085 165/41 |
| 2013/0092463 A1* | 4/2013 | Hori | ........... | B60K 11/085 180/68.1 |
| 2014/0132033 A1* | 5/2014 | Townson | ........... | B62D 27/06 296/193.1 |
| 2014/0273806 A1* | 9/2014 | Frayer, III | ........... | B60K 11/085 454/335 |
| 2016/0129778 A1* | 5/2016 | Jeong | ........... | B62D 25/085 180/68.1 |
| 2017/0326970 A1* | 11/2017 | Schoening | ........... | B60K 11/04 |
| 2017/0326971 A1* | 11/2017 | Cosmo | ........... | B60K 11/085 |
| 2018/0009492 A1* | 1/2018 | Watanabe | ........... | B60K 11/085 |
| 2018/0086199 A1* | 3/2018 | Solazzo | ........... | G01R 33/07 |
| 2018/0154764 A1* | 6/2018 | Uchida | ........... | B60R 19/48 |
| 2018/0170170 A1* | 6/2018 | Nam | ........... | B60K 11/085 |
| 2018/0244146 A1* | 8/2018 | Geipert | ........... | B60K 11/085 |
| 2019/0001809 A1* | 1/2019 | Fujitani | ........... | B60K 11/085 |

FOREIGN PATENT DOCUMENTS

| | | | | |
|---|---|---|---|---|
| DE | 102011004169 A1 * | 8/2012 | ......... | B60H 1/00671 |
| DE | 102011055394 A1 * | 5/2013 | ........... | B60K 11/085 |
| DE | 102011120324 A1 * | 6/2013 | ........... | B60K 11/085 |
| DE | 102012000173 A1 * | 7/2013 | ........... | B60K 11/085 |
| DE | 102013106036 A1 * | 12/2014 | ............. | B60K 11/08 |
| DE | 102016014038 A1 * | 5/2018 | | |
| DE | 102018100032 A1 * | 7/2018 | ........... | B60Q 1/0441 |
| DE | 102017105568 A1 * | 9/2018 | ............. | B60K 11/08 |
| EP | 3272565 A1 * | 1/2018 | ........... | B60K 11/085 |
| FR | 2860575 A1 * | 4/2005 | ........... | B60K 11/085 |
| FR | 2965857 A1 * | 4/2012 | ........... | B60K 11/085 |
| KR | 2011-0002149 A | 1/2011 | | |
| KR | 20150071262 A * | 6/2015 | | |
| NO | 2006-056359 A1 | 6/2006 | | |
| WO | WO-2015171623 A1 * | 11/2015 | ........... | B60K 11/085 |
| WO | WO-2015178172 A1 * | 11/2015 | ............. | B60K 11/04 |
| WO | WO-2016206937 A1 * | 12/2016 | ........... | B60K 11/085 |
| WO | WO-2018029655 A1 * | 2/2018 | ........... | B29C 45/006 |
| WO | WO-2019002727 A1 * | 1/2019 | ........... | B60K 11/085 |

OTHER PUBLICATIONS

Translated CN-107323399-A (Year: 2022).*
Translated FR-2860575-A1 (Year: 2022).*
FR Search Report, dated Feb. 20, 2020, from corresponding FR application No. 1903580.

* cited by examiner

VENTILATION DEVICE FOR A VEHICLE, ASSOCIATED MOUNTING METHOD

CROSS-REFERENCE TO RELATED APPLICATIONS

This application is a U.S. non-provisional application claiming the benefit of French Application No. 19 03580, filed on Apr. 3, 2019, which is incorporated herein by reference in its entirety.

FIELD

The present invention relates to a ventilation device for a vehicle comprising a frame defining an opening and a closure device comprising at least one closure flap extending along a general direction in the opening, and comprising a first section, having a first external face, and at least a second section, having a second external face, the external face of the closure flap being formed by the first external face and by the second external face, the first section and the second section extending in continuity of each other.

The invention relates more particularly to a ventilation device intended to manage the air flows of a motor vehicle. This system may advantageously be used for managing the temperature of the vehicle engine, but it may also be used for managing the aerodynamics of the vehicle.

BACKGROUND

Such a ventilation device is, for example, arranged at the front of the vehicle and is part of the radiator grille of the vehicle. The ventilation device allows the management of an incoming air flow that is intended to be in contact with the radiator to enable the engine to be kept at the optimal operating temperature. This known device advantageously makes it possible to combine an efficient aerodynamic shape of the vehicle and an optimal engine operating temperature.

The closure devices of these ventilation devices pose rigidity problems, in particular in the case of large-size closure flaps, i.e. closure flaps having a length greater than or equal to 450 millimeters (mm).

In addition, when these closure flaps are prominent from outside the vehicle, the risk of the closure flaps bending becomes significant due to the air pressure on the closure flap becoming very high.

To solve these problems, it is known from the prior art to provide several separate closure flap devices having flaps of shorter length extending in continuity with each other, and each having a system for rotating the closure flaps. The choice of the size and shape of the closure flaps is therefore limited.

These closure devices are relatively bulky, while being complex to produce and install on the vehicle due to the multiplicity of parts involved in the manufacture of these devices.

In addition, these closure devices can spoil the aesthetics of the vehicle, the transition between the adjacent flaps being prominent, in particular when these are prominent from outside the vehicle, while the intention of the car manufacturers is to adapt the grille to suit the style of the vehicle so that it integrates optimally and aesthetically with the design of the vehicle.

SUMMARY

The invention aims to overcome these drawbacks by proposing an improved ventilation device.

To this end, the invention relates to a ventilation device of the aforementioned type in which the first section is secured to the second section in a junction region, wherein a trimming piece covers at least the junction region on the external face of the closure flap.

The joining of the first section and the second section of the closure flap makes it possible to manufacture closure flaps of significant length while retaining simplicity of system and installation.

The installation of such a closure flap is thus improved and, in particular, allows easier installation of curved or cambered closure flaps, more particularly curved closure flaps of large dimension.

The trimming piece also makes it possible to improve the integration of the closure flap device into the design of the vehicle from an aesthetic point of view, the junction between the two sections of the flap not being prominent from outside the vehicle.

According to one embodiment, the ventilation device comprises one or more of the following characteristics, taken individually or in combination:
  the first section comprises a fixing region while the second section comprises a fixing region, the fixing region of the first section having a shape that is complementary to the fixing region of the second section,
  the fixing region of the first section and the fixing region of the second section being secured to one another, the fixing region of the first section comprising a first interaction face and the fixing region of the second section comprising a second interaction face, the fixing region of the first section being secured to the fixing region of the second section, so that the first interaction face and the second interaction face abut each other in a plane substantially parallel to the external face of the closure flap, the plane extending substantially midway between the external face and an internal face of the closure flap, opposite the external face.

The securing of the first section and the second section according to the invention allows the closure flap to maintain acceptable structural properties for use in a ventilation device, while facilitating the installation of the closure flap on the vehicle.

According to other advantageous aspects of the invention, the ventilation device comprises one or more of the following characteristics, taken in isolation or in any technically feasible combination:
  the trimming piece covers all of the external faces of the first and the second sections,
  a support comprises first and second holding members, the first section being linked to the first holding member, the second section being linked to the second holding member,
  an intermediate holding member, placed between the first holding member and the second holding member, supports the first and second sections in the junction region, and
  the first section and the second section are installed so as to rotate about an axis of each holding member.

The invention also relates to a vehicle comprising a ventilation device for a vehicle as described above.

The invention also relates to a method of installation of a ventilation device of a vehicle comprising the following steps:
  fixing of the first section on the support;
  fixing of the second section on the support;
  joining of the first and second sections; and installation of the trimming piece on the outside of the closure flap.

The process according to the invention may comprise the following characteristics:

fixing of the first section on the support with a first pivot assembly;

fixing of the second section on the support with a second pivot assembly, different from the first pivot assembly, wherein once joined together the first section and the second section are unable to be engaged on the first and second holding members by common kinematics.

BRIEF DESCRIPTION OF THE DRAWINGS

The invention will be better understood upon reading the description which follows, given solely by way of non-limiting example and made with reference to the drawings, in which.

A first direction X is defined. In the present example, the first direction is parallel to a front-rear axis of the vehicle. The first direction is denoted "first direction X".

DETAILED DESCRIPTION

In the present description, a second direction is also defined parallel to the axes of the vehicle. The second direction is denoted "second direction Y" and thus corresponds to the width of the vehicle.

Finally, a third direction is also defined, perpendicular to the first direction X and to the second direction Y. In the present example, the third direction corresponds to the height of the vehicle. The third direction is denoted "third direction Z".

All the volumes contained in a vehicle are described as internal. By extension, an internal face is defined as a face facing an internal volume of the vehicle. In contrast, any volume that is outside the vehicle is qualified as external and an external face is turned towards an external volume.

Figure 1:
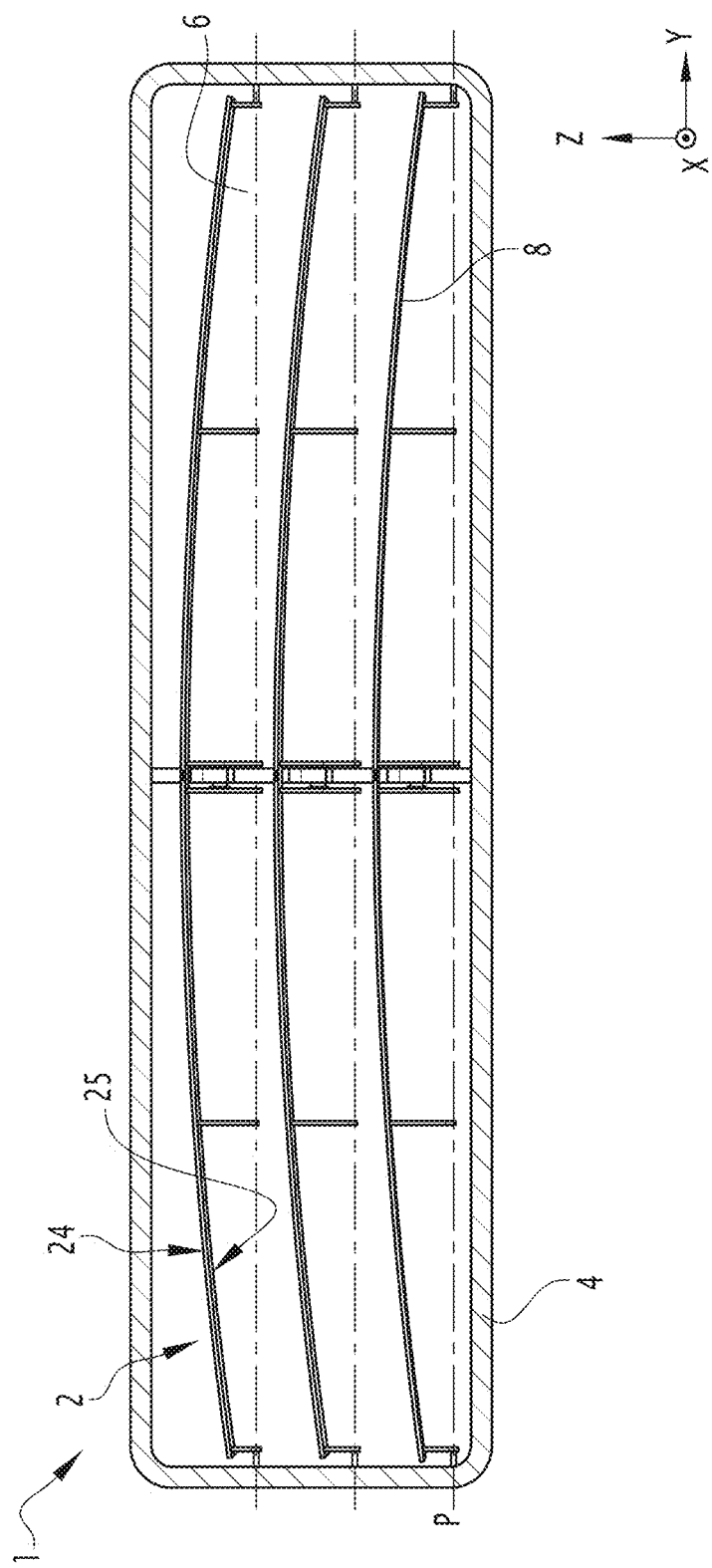
FIG. 1 is a front view of part of the ventilation device according to the invention, the closure device being in an open position.

Referring to FIG. 1, there is described a ventilation device 1 comprising a closure device 2 and a frame 4. Such a ventilation device 1 is intended to be installed on a vehicle, for example in front in the bumper of the vehicle.

The frame 4 defines an air intake opening 6 in the vehicle.

According to one embodiment, the frame 4 is formed by the bumper of the vehicle. Thus, the opening 6 may be, for example, formed in a bumper skin of the vehicle.

Alternatively, the frame 4 may be formed by a module of the vehicle and/or by a part intended to be installed on the vehicle.

Figure 2:
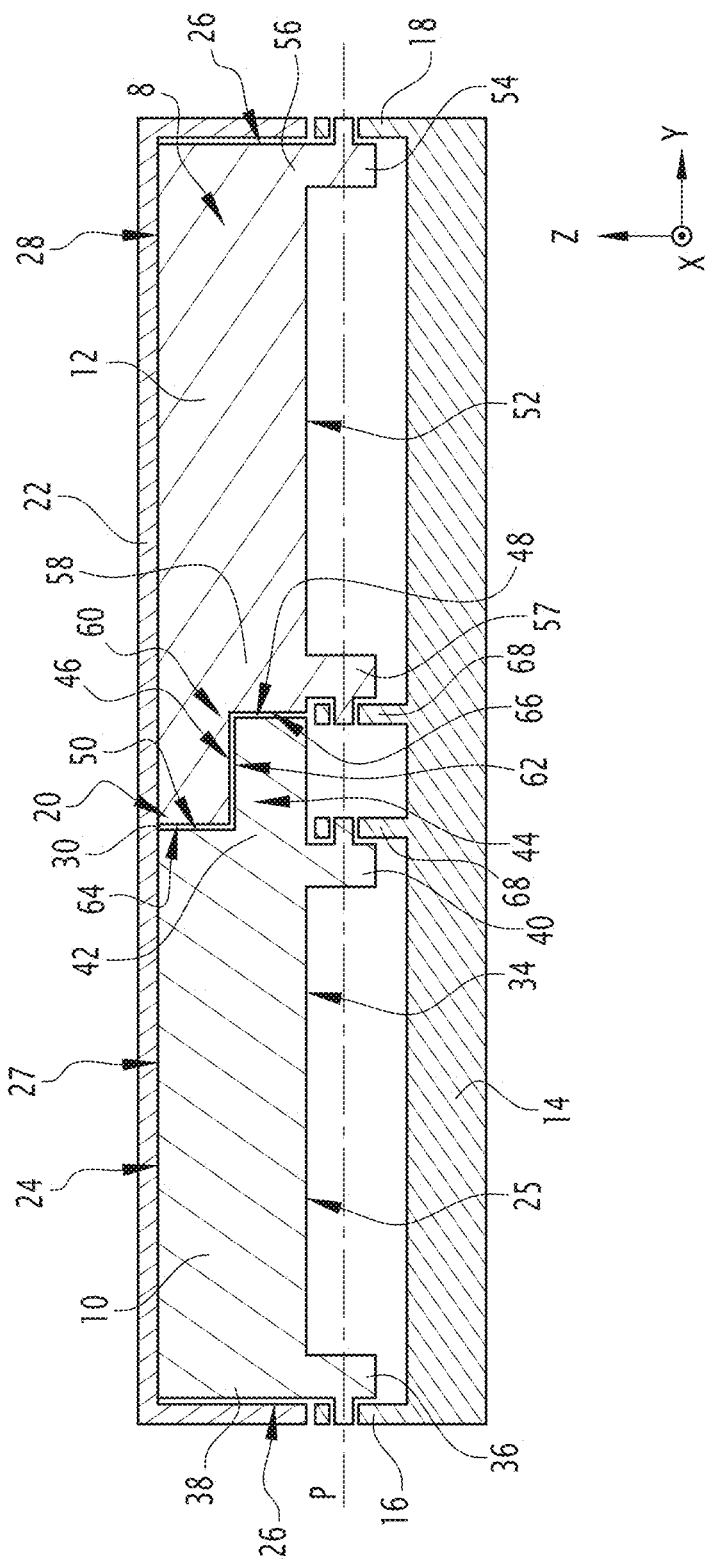
FIG. 2 is a schematic front view of part of the ventilation device according to the invention, the closure device being in an open position.
Figure 3:
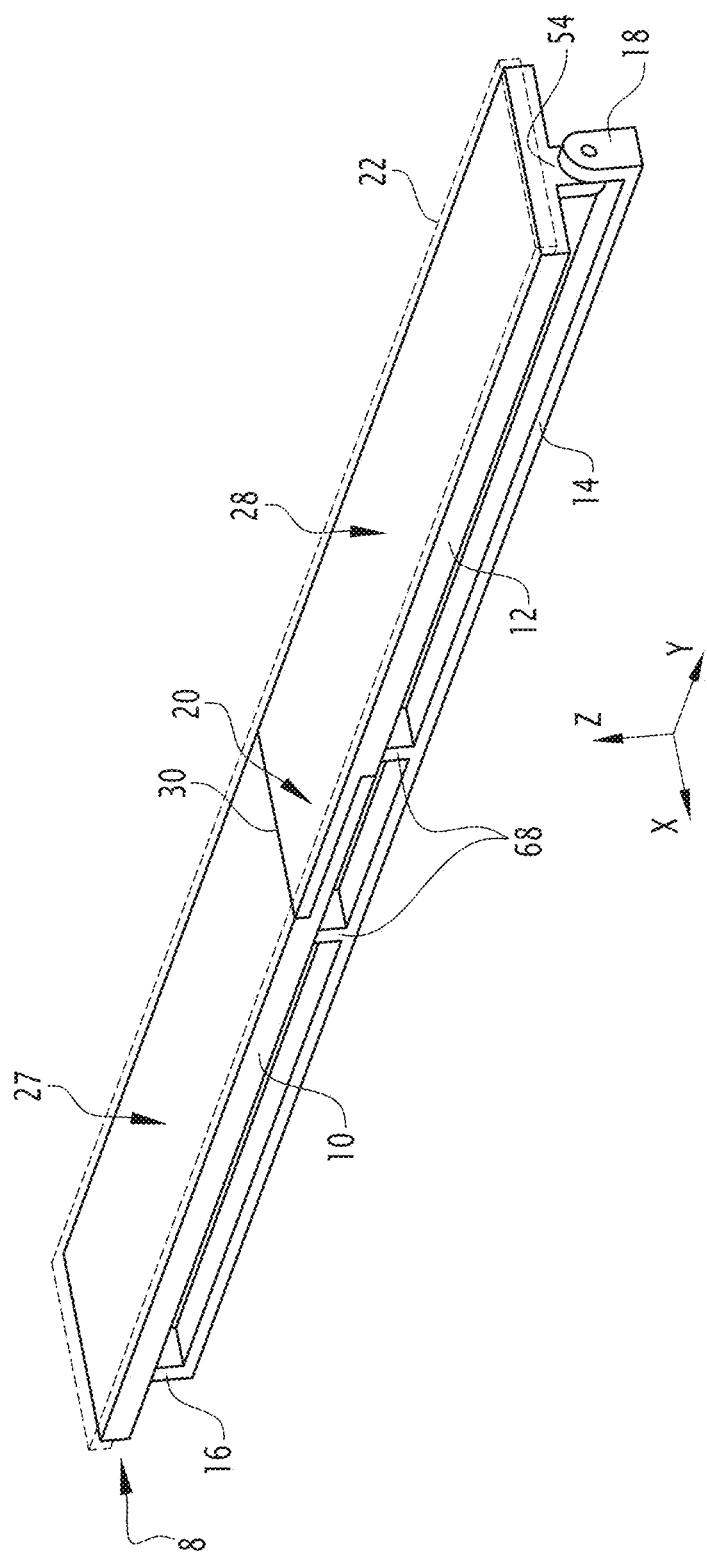
FIG. 3 is a schematic perspective representation of part of the ventilation device according to the invention, the closure device being in an open position.

The closure device 2 comprises at least one closure flap 8. The closure flap 8 comprises a first section of the closure flap 10 and a second section of the closure flap 12 as illustrated in FIG. 2. In the further description, the closure flap 8 may be called "closure flap 8", the first section of closure flap 10 may be called "first section 10", while the second section of the closure flap 12 may be called "second section 12".

The first section 10 and the second section 12 are secured to each other at a junction region 20.

The ventilation device also comprises a trimming piece 22 covering the junction region 20.

The ventilation device comprises a support 14 comprising a first holding member 16 and a second holding member 18. The support 14 may be, for example, secured to the frame 4, while the closure flap 8 may be connected to the support 14.

In the present exemplary embodiment, the closure device 2 may comprise a plurality of closure flaps 8. The closure flaps 8 may be made, for example, of a polymer.

For example, the closure flap 2 may comprise a number of flaps between two and twenty.

Each closure flap 8 has a general direction parallel to the second direction Y.

Each closure flap 8 extends in the second direction Y in the opening 6. In the case where the device comprises several closure flaps 8, the closure flaps are then arranged one above the other mainly in the third direction Z.

Each flap 8 has an internal face 25, opposite the external face 24. Each flap 8 also has lateral faces 26, connecting the internal face 25 and the external face 24 and defining the ends of the flap 8 in a direction Y. According to various embodiments, the lateral faces 26 may be perpendicular or inclined at an angle defined with respect to the internal face 25 and the external face 24. The lateral faces 26 may also form a non-planar surface between the internal face 25 and the external face 24.

The first section has a first external face 27 while the second section has a second external face 28.

The external face 24 of the closure flap 8 is formed by the first external face 27 and the second external face 28. The first external face 27 and the second external face 28 extend in continuity with one another so as to form the external face 24 of the closure flap in a substantially continuous manner. The general shape of the external face 24 is continuous. The general shape of the external face 24 may be, for example, a plane. According to another embodiment, the general shape of the external face 24 may be curved. For example, the radius of curvature of the external face is between 3 and 4 meters.

The external face 24 comprises a break 30 between the first external face 27 and the second external face 28. The junction region 20 comprises, for example, the break 30, a part of the first external face 27 and a part of the second external face 28.

The trimming piece 22 is placed on the external face 24. The trimming piece covers at least the junction region 20. In particular, the trimming piece 22 covers the break 30 defined by the first external face and the second external face 28. The trimming piece covers at least one region of the first external face 27 and at least one region of the second external face 28. Advantageously, the trimming piece covers all of the first external face 27 and all of the second external face 28. The trimming piece 22 then covers the entire external face 24. Advantageously, the trimming piece 22 also covers a region of the lateral faces 26.

The trimming piece 22 makes it possible, in particular, to improve the aesthetics of the ventilation device 1 by hiding the break 30. The trimming piece, when it covers all of the first external face 27 and all of the second external face 28 gives a continuous appearance to the closure flap 8. The trimming piece 22 can also form a cover hiding the break 30 and improving the aesthetics of the ventilation device 1 without giving a continuous appearance to said closure flap 8.

According to the embodiment in which the trimming piece covers the whole of the second external face 28, and when the closure device 2 is closed, the break 30, the first section 10 and the second section 12 are not prominent from outside of the vehicle. In fact, the only prominent part of the closure flap 8 is the trimming piece 22. The continuity of the trimming piece offers a satisfactory aesthetic appearance.

The trimming piece 22 can be secured to the first section 10 and the second section 12 by means suitable for securing such elements. The means suitable for securing such elements comprise, for example, mechanical, chemical or welding means.

The first section 10 has a general direction parallel to the second direction Y. The first section 10 may be, for example, an elongated plate in the direction Y. The thickness of the first section 10 is defined in a direction perpendicular to the first external face 27. The thickness of the first section is significantly less than the other dimensions of the first section 10. In particular, the thickness is significantly less than the length in the general direction. The thickness may be, for example, at least twenty times less than the length in the general direction. The thickness is also significantly less than the length in the direction perpendicular to the plane formed by the general direction and the direction of the thickness, also called width. The thickness may be, for example, at least five times thinner than the width.

The first section comprises a first internal face 34, opposite the first external face 27 in the thickness direction of the first section 10. The first internal face 34 forms part of the internal face 25 of the closure flap 8.

The first section comprises a tab for holding the end of the first section 36, for example placed on the first internal face 34, for example at an external end of the first section 38.

The first section also comprises a first intermediate retaining tab 40, placed, for example, on the first internal face 34, for example at an internal end of the first section 42.

The first section 10 also includes a fixing region 44.

The fixing region 44 is placed at the internal end 42.

According to a particular embodiment, the fixing region 44 comprises a first interaction face 46, an external abutment face 48 and an internal abutment face 50.

The internal abutment face 50 is perpendicular to the first external face 27. This face extends, for example, from the first external face 27 up to half the thickness of the first section 10 and along the entire width of the first section 10. This internal abutment face 50 therefore extends between the external face 20 and the plane extending midway between the external face 24 and the internal face 25 of the closure flap 8.

The external abutment face 48 is perpendicular to the first internal face 34. This face extends, for example, from the first internal face 34 to half the thickness of the first section 10, and along the entire width of the first section 10. This external abutment face 48 therefore extends between the first internal face 34 and the plane extending midway between the external face 24, and the internal face 25 of the closure flap 8.

The internal abutment face 50 and the external abutment face 48 are not coplanar. The distance between the external end 38 of the first section and the internal abutment face 50 is less than the distance between the external end 38 of the first section and the external abutment face 48.

The interaction face of the first section 46 is parallel to the first external face 27 and to the first internal face 34. The interaction face of the first section 46 advantageously extends along a median surface to the external face 24 of the flap and to the internal face 25 of the closure flap 8. The interaction face 46 extends, for example, in the plane extending halfway between the external face 24 and the internal face 25 of the closure flap 8. The interaction face extends between the internal abutment face 50 and the external abutment face 48.

The fixing region 44 of the first section is fixed to the second section 12.

Similarly to the first section 10, the second section 12 has a general direction parallel to the second direction Y.

The second section 12 may be, for example, an elongated plate in the direction Y.

The thickness of the second section 12 is defined in a direction perpendicular to the second external face 28. The thickness of the second section 12 is similar to the thickness of the first section 10. The width of the second section 12 is defined in a similar manner to the thickness of the first section 10 and is similar to the width of the first section 20.

The second section comprises a second internal face 52 opposite the second external face 28 in the direction of the thickness of the second section 12. The second internal face 52 of the second section 12 forms part of the internal face 25 of the closure flap 8.

The second section comprises a tab for holding the end of the second section 54, for example placed on the second internal face 52, for example at an external end of the second section 56.

The second section also comprises an intermediate retaining tab of the second section 57, placed, for example, on the second internal face 52, for example at an internal end 58 of the second section.

The second section 12 also includes a fixing region 60.

The fixing region 60 is placed at the internal end 58.

According to a particular embodiment, the fixing region 60 comprises an interaction face of the second section 62, an external abutment face 64, and an internal abutment face 66.

The fixing region 60 is secured to the first section 10. More particularly, the fixing region 60 is secured to the fixing region 44. The fixing regions 60 and 44 interact in the junction region 20.

The fixing region of the second section 60 is of complementary shape to the fixing region of the first section 44.

The interaction face of the first section 46 and the interaction face of the second section 62 are intended to be supported one upon the other, and the shape of these faces is suitable for installation.

According to a particular embodiment, the external abutment face 64 is perpendicular to the second external face 28. This face extends, for example, from the second external face 28 to half the thickness of the second section 12 and follows the entire width of the second section 12. This external abutment face 64 therefore extends between the second external face 28 and the plane extending halfway between the external face 24 and the internal face 25 of the closure flap 8.

The internal abutment face 66 is perpendicular to the second internal face 52. This face extends, for example, from the second internal face 52 to half the thickness of the second section 12 and along the entire width of the second section. This internal abutment face 66 therefore extends between the second internal face 52 and the plane extending midway between the external face 24 and the internal face 25 of the closure flap 8.

The internal abutment face 66 and the external abutment face 64 are not coplanar.

The distance between the internal abutment face 66 and the external abutment face 64 is equal to the distance between the internal abutment face 50 and the external abutment face 48.

The interaction face of the second section 62 is parallel to the second external face 28 and to the second internal face 52. The interaction face of the first section 62 advantageously extends along a median surface to the external face 24 of the flap and to the internal face 25 of the closure flap. The interaction face 62 extends, for example, in the plane extending midway between the external face 24 and the internal face 25 of the closure flap.

The interaction face 62 extends between the external abutment face 64 and the internal abutment face 66.

The fixing region 44 is secured to the fixing region 60. The first section 10 and the second section 12 are secured at the interface between the fixing region 44 and the fixing region 60. This type of fastening is known in the field of carpentry and forms an assembly called "interlocking wood joint".

The geometry of the fixing regions 44 and 60 differs according to the embodiment and the connection is not limited to an assembly of the "interlocking wood joint" type. The fixing regions 44 and 60 are of complementary shapes and the type of fixing may also be in the form of a so-called "dovetail", "straight tail", "fork", "float" or any other type of suitable interlocking wood joint assembly.

The support 14 holds the closure flap 8. More particularly, the first holding member 16 and the second holding member 18 hold the closure flap 8.

The first section 10 is linked to the first holding member 16, and is, for example, rotatable relative to the first holding member 16, while the second section 12 is linked to the second holding member 18, and is, for example, rotatable relative to the second holding member 18.

The support 14 comprises an intermediate holding member 68, placed between the first holding member 16 and the second holding member 18.

According to the embodiment, the intermediate holding member 68 is placed between the first of the intermediate retaining tabs 40 and 57, or said intermediate retaining tabs 40 and 57 are placed between two regions of the holding member 68.

According to one embodiment, the closure device 2 has an open position in which the opening 6 is at least partially open so that a flow of air can circulate through the opening 6, for example in the first direction X when the closure device 2 is installed on the vehicle, and a closure position in which the closure device 2 at least partially closes the opening 6.

An air passage surface is defined through the ventilation device 1 delimited between the frame 4 and the closure flap device 2. When the closure device 2 is in the closed position, the air passage surface is less than the air passage surface when the closure device 2 is in the open position.

According to one embodiment, the air flow is completely interrupted when the closure device 2 is in the closed position. Each closure flap 8 is movable between an open position when the closure device 2 is in the open position, and a closed position when the closure device 2 is in the closed position. Each closure flap 8 is rotatable between the open position and the closed position around a pivot axis P.

The pivot axis P of each closure flap 8 is, in this example, substantially parallel to the second direction Y.

Alternatively, the pivot axis P of at least one closure flap 8 forms a non-zero angle with the second direction Y, the first direction X and/or the third direction Z.

A rotation angle of the closure flaps 8 is defined between the open position and the closed position about the pivot axis P.

For example, the angle of rotation is substantially equal to 90°.

In the closed position, an external face 24 of each closure flap 8 is oriented against the direction of the air flow. This advantageously makes it possible to improve the drag coefficient Cx of the vehicle in the closed position.

More particularly, the first section is installed to be rotatable on the first holding member 16 and on the intermediate holding member 68 around the pivot axis P. The second section is installed to be rotatable on the second holding member 18 and on the intermediate holding member 68 around the pivot axis P.

The closure flap 8 comprising the first section 10 and the second section 12 secured together, is thus installed to be rotatable about the holding members 16 and 18 as well as about the intermediate holding member 68.

The installation of the movable flap 8 to be rotatable about the intermediate holding member 68 improves the maintenance of the closure flap 8 and, in particular, prevents potential jamming of the closure device 2 which may occur following excessive deformation of the closure flap 8, for example following a large aerodynamic force on a large closure flap.

The closure flap 8 may include a number of sections greater than 2. The connection between a section n and a section n+1 where n is a natural number, is then similar to the connection described above between the first section 10 and the second section 12.

A method of installing such a ventilation device will now be described.

The first section 10 and the second section 12 are first manufactured. They are made, for example, of a polymer material.

The support 14 is made, for example from the same material as the flaps, in particular from a polymer material. According to a particular embodiment, the support is a metal part.

The trimming piece is made, for example from a polymer material.

According to a first installation method, the first section 10 is secured first of all to the second section 12 by securing the fixing region 44 to the fixing region 60. The fixing region 44 is, for example, glued to the fixing region 60.

The closure flap 8 thus formed by assembling the first section 10 to the second section 12 is then secured to the support 14. The end retaining tabs 36, 54 and the intermediate retaining tabs 40, 57 are engaged in the first holding member 16 and the second holding member 18, as well as in the intermediate holding member 68, the retaining tabs 36, 54, 40, 57 forming, for example, with the holding members 16, 18, 68 the hinges of the closure flap 8.

The trimming piece 22 is then installed on the closure flap 8. The trimming piece 22 is, in particular, installed on the external face 24 of the closure flap. The trimming piece may be, for example, glued, riveted, welded, clipped or screwed onto the closure flap.

A second installation method includes, as in the previous method, the step of securing the first section 10 to the second section 12.

The trimming piece 22 is then directly installed on the closure flap 8 thus formed before the closure flap is secured to the support 14 as described in the first installation method.

A third installation method first comprises securing of the first section 10 to the support 14, according to a first pivot assembly.

The first pivot assembly includes a set of displacements of the first section 10 intended to result in the installation of the first section 10 on the support 14.

The first pivot assembly comprises the engagement of the end retaining tab 36 in the first holding member 16 and the engagement of the intermediate retaining tab 40 in the intermediate holding member 68. The first pivot assembly is, for example, specific to the first section 10. The first pivot assembly comprises, for example, engagement of the first section 10 on the holding member in a particular direction specific to the first section.

The second section 12 is secured to the support 14 according to a second pivot assembly. The second pivot assembly comprises a set of displacements of the second section 12 intended to result in the installation of the second section 12 on the support 14. The second pivot assembly is, for example, different from the first pivot assembly and incompatible with the latter. Thus, the displacement assembly of the second section 12 intended to result in the installation of the second section 12 on the support 14 is different from the displacement assembly of the first section 10 intended to result in the installation of the first section 10 on the support 14, the first pivot assembly applied to the second section 12 not leading to the installation of the second section 12 on the support 14 and vice versa.

The second pivot assembly comprises the engagement of the end retaining tab 54 in the second holding member 18 and the engagement of the intermediate retaining tab 57 in the intermediate holding member 68. The second pivot assembly comprises, for example, engagement of the second section 12 on the holding members 18, 68 in a particular direction specific to the second section 12.

The first section 10 and the second section 12 are then joined together by securing the fixing region 44 to the fixing region 60.

The trimming piece 22 is then installed on the closure flap 8, as described in the first installation method.

Such a third installation method allows, for example, the closure flap 8 to be locked on the support 14 once the fixing region 44 is secured to the fixing region 60. In fact, as the assembly and disassembly kinematics of the first section 10 and the second section 12 are different and incompatible, it is impossible to disassemble the first section 10 and the second section 12 simultaneously, without separating the fixing region 44 from the fixing region 60. This locking of the closure flap 8 on the support 14 does not require additional space for the ventilation device 1, and thus improves the safety and robustness of the device without increasing its complexity.

The invention claimed is:

1. A ventilation device for a vehicle, the ventilation device comprising:
    a frame defining an opening;
    a closure device comprising at least one closure flap extending in the opening,
    the closure flap comprising i) a first section, having a first external face and ii) at least a second section, having a second external face,
    an external face of the closure flap being formed by the first external face and by the second external face, the first section and the second section extending in continuity with another,
    wherein the first section is joined to the second section in a junction region with a break being located between the first external face and the second external face; and
    a trimming piece covering at least the junction region on the external face of the closure flap,
    wherein the trimming piece is secured to the first section and the second section, and
    wherein the trimming piece covers the closure flap in one continuous piece, hiding the break of the external face between the first section and the second section.

2. The ventilation device for a vehicle according to claim 1, wherein the first section comprises a fixing region and the second section comprises a fixing region, the fixing region of the first section being of complementary shape to the fixing region of the second section, the fixing region of the first section and the fixing region of the second section being secured to one another.

3. The ventilation device for a vehicle according to claim 2, wherein the fixing region of the first section comprises a first interaction face, while the fixing region of the second section comprises a second interaction face, the fixing region of the first section being integral with the fixing region of the second section, so that the first interaction face and the second interaction face abut one another in a plane substantially parallel to the external face of the closure flap, the plane extending substantially midway between the external face and an internal face of the closure flap, opposite the external face.

4. The ventilation device for a vehicle according to claim 1, wherein the trimming piece covers all of the external faces of the first section and the second section.

5. The ventilation device for a vehicle according to claim 1, wherein a support comprises a first holding member and a second holding member, the first section being linked to the first holding member, the second section being linked to the second holding member.

6. The ventilation device for a vehicle according to claim 5, wherein an intermediate holding member, placed between the first holding member and the second holding member, supports the first section and second section in the junction region.

7. The ventilation device for a vehicle according to claim 5, wherein the first section and the second section are installed to be able to rotate about an axis of each holding member.

8. A vehicle comprising the ventilation device according to claim 1.

9. A method of installing the ventilation device according to claim 5, comprising:
    fixing the first section on the support;
    fixing the second section on the support;
    joining of the first section and the second section; and
    installation of the trimming piece on the external face of the closure flap.

10. The method according to claim 9, wherein,
    the first section is fixed to the support with a first pivot assembly; and
    the second section is fixed to the support with a second pivot assembly, different from the first pivot assembly.

11. The ventilation device for a vehicle according to claim 1, wherein the junction region comprises the break, a part of the first external face, and a part of the second external face, and the trimming piece covers at least one region of the first external face and at least one region of the second external face.

* * * * *